US011198812B2

(12) United States Patent
Nino-Penaloza et al.

(10) Patent No.: US 11,198,812 B2
(45) Date of Patent: Dec. 14, 2021

(54) USE OF SEQUESTERING AGENT IN GLDA-BASED TREATMENTS FOR SILICEOUS FORMATIONS

(71) Applicant: Baker Hughes Holdings LLC, Houston, TX (US)

(72) Inventors: Andrea Nino-Penaloza, Houston, TX (US); D.V. Satyanarayana Gupta, The Woodlands, TX (US); Sandra L. Berry, Tomball, TX (US); Harold G. Hudson, The Woodlands, TX (US); Elizabeth McCartney, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/612,967

(22) PCT Filed: May 24, 2017

(86) PCT No.: PCT/US2017/034309
§ 371 (c)(1),
(2) Date: Nov. 12, 2019

(87) PCT Pub. No.: WO2018/217200
PCT Pub. Date: Nov. 29, 2018

(65) Prior Publication Data
US 2020/0165511 A1 May 28, 2020

(51) Int. Cl.
*E21B 43/28* (2006.01)
*C09K 8/74* (2006.01)
*C09K 8/54* (2006.01)
*E21B 43/26* (2006.01)

(52) U.S. Cl.
CPC ............... *C09K 8/74* (2013.01); *C09K 8/54* (2013.01); *E21B 43/26* (2013.01); *E21B 43/28* (2013.01); *C09K 2208/32* (2013.01)

(58) Field of Classification Search
None
See application file for complete search history.

(56) References Cited

U.S. PATENT DOCUMENTS

| 2,663,689 A | 12/1953 | Kingston et al. |
| 3,481,401 A | 1/1968 | Graham |
| 3,868,996 A | 3/1975 | Lybarger et al. |
| 3,953,340 A | 4/1976 | Templeton et al. |
| 5,529,125 A | 6/1996 | DiLullo Arias et al. |
| 6,443,230 B1 | 9/2002 | Boles et al. |
| 6,531,427 B1 | 3/2003 | Shuchart et al. |
| 7,059,414 B2 | 6/2006 | Rae et al. |
| 7,781,381 B2 | 8/2010 | Ke et al. |
| 7,994,102 B2 | 8/2011 | Gupta et al. |
| 8,789,596 B2 | 7/2014 | Curtis et al. |
| 9,150,780 B2 | 10/2015 | DeWolf et al. |
| 2008/0058229 A1* | 3/2008 | Berkland ............... C09K 8/706 507/211 |
| 2008/0182761 A1 | 7/2008 | Stephenson et al. |
| 2008/0277112 A1 | 11/2008 | Welton et al. |
| 2010/0126864 A1 | 5/2010 | Heus et al. |
| 2012/0325485 A1 | 12/2012 | Qu et al. |
| 2013/0274154 A1* | 10/2013 | Nasr-El-Din ............ C09K 8/72 507/241 |
| 2013/0281329 A1 | 10/2013 | DeWolf et al. |
| 2015/0101818 A1 | 4/2015 | Gupta et al. |
| 2016/0272879 A1* | 9/2016 | Reddy .................... C09K 8/725 |

FOREIGN PATENT DOCUMENTS

WO 2018217200 A1 11/2018

OTHER PUBLICATIONS

Mahmoud, M.A., et al., "High-Temperature Laboratory Testing of Illitic Sandstone Outcrop Cores with HCl-Alternative Fluids," Feb. 2015, SPE Production & Operations.
Mahmoud, M.A., et al., "Removing Formation Damage and Stimulation of Deep Illitic-Sandstone Reservoirs Using Green Fluids," SPE147395, 2011, Society of Petroleum Engineers.
Nasr-El-Din, H.A., "Field Treatment to Stimulate an Oil Well in an Offshore Sandstone Reservoir Using a Novel, Low Corrosive, Environmentally Friendly Fluid," SPE168163, 2014, Society of Petroleum Engineers.
Reyes, E.A., "GLDA/HF Facilities High Temperature Acidizing and Coiled Tubing Corrosion Inhibition," SPE174264-MS, 2015, Society of Petroleum Engineers.
Zhou, L., et al., "Acidizing Sandstone Formations Using a Sandstone Acid System for High Temperatures," SPE165084, 2013, Society of Petroleum Engineers.

* cited by examiner

Primary Examiner — Andrew Sue-Ako
(74) Attorney, Agent, or Firm — John Wilson Jones; Jones Delflache LLP

(57) ABSTRACT

Sandstone formations of oil and gas and geothermal wells may be successfully stimulated with a fluid containing GLDA or salt and HF or a HF-generating component and an organophosphonate component. The organophosphonate acts as a sequestering agent and reduces the amount of metal fluoride precipitates produced.

20 Claims, No Drawings

USE OF SEQUESTERING AGENT IN GLDA-BASED TREATMENTS FOR SILICEOUS FORMATIONS

FIELD OF THE DISCLOSURE

The disclosure relates to a method of enhancing the permeability of a siliceous formation with a fluid containing a glutamic-N,N-diacetic acid, salt or a mixture thereof; HF or HF-generating component and an organophosphonate. The method includes minimizing or preventing the formation of deposits by forming complexes with the organophosphonate at in-situ downhole conditions.

BACKGROUND OF THE DISCLOSURE

Matrix acidizing is a common method used to stimulate and enhance the production of hydrocarbons from a hydrocarbon producing formation. The objective of the stimulation is to remove damage to the targeted zone of the formation which principally occurred during drilling or completion, especially in near wellbore regions. The damage, which impairs fluid flow of produced hydrocarbons, is typically created by an accumulation of silica fines or clays (aluminosilicates).

In matrix acidizing of sandstone formations, a fluid containing a corrosive low pH acid or acid-forming material, commonly a mud acid, is injected into the formation such that the acid or acid-forming material reacts with minerals in the formation. This increases the size of the pores within the formation and thus provides enlarged passageways for hydrocarbon, water, or steam to more freely. In addition to increasing the permeability of the formation, damage caused by drilling mud invasion and clay migration is removed.

Mud acids are typically a combination of HCl and HF, having a pH of less than zero. HF is highly reactive with authigenic clays, such as smectite, kaolinite, illite and chlorite, all of which are principal components of sandstone. The HCl in the mud acid maintains the requisite low pH. In light of the quick reaction of HF with silica and silicates, the HCl may penetrate only a few inches into the formation before HF is spent. Means of reducing the reaction rate of HF within the area surrounding the wellbore consist of the slow hydrolysis of ammonium bifluoride to convert it to HF, either at the surface or within the well. While such methods allow the acid to penetrate slightly further into the formation, they do not eliminate precipitates from forming and clogging the matrix.

Further, some sandstone reservoirs are sensitive to HCl based fluids. For instance, when HCl contacts illite, it breaks down and causes the migration of fines and formation damage. The migration of fines through the porous media blocks the pores, thereby reducing permeability, and decreasing the production rate of oil and gas from the formation.

Generally, sandstone formations are composed of clay minerals which are essentially unstable in HCl at temperatures greater than 300° F. Since clays are normally a part of the cementitious material that holds the sand grains of sandstone formations together, the dissolution of clay also weakens and de-consolidates the sandstone matrix in the vicinity of the wellbore, thus causing damage to the formation. Acidizing further generates solid precipitates or colloidal amorphous gels of potassium, sodium and calcium which are insoluble and clog or plug the pore spaces of the formation, thereby reducing the porosity and permeability of the formation and impairing flow potential. The damaging effects due to both the de-consolidation of the matrix and the precipitation of complexes can eliminate or even revert the stimulation effect of the acid treatment.

Most sandstones contain varying quantities of carbonate minerals (calcite, dolomite, etc.) along with quartz, clays and feldspars that usually form the bulk of the rock. In the presence of acids, the carbonate minerals dissolve and release monovalent and divalent ions, notably calcium. Such ions, in turn, react with fluoride ions to produce highly insoluble metal fluorides such as calcium fluoride, $CaF_2$, as well calcium fluorosilicate. Such insoluble precipitates often form quickly and cause formation damage by blocking pores. Production is therefore dramatically decreased.

To minimize the formation of such precipitates, traditional mud acid matrix treatments in sandstone formations are preceded by a preflush, usually consisting of HCl or other non-fluoride containing acid, to dissolve the carbonates. The preflush is pumped in sufficient volume to theoretically remove all carbonates within a radius of two to three feet from the wellbore. Often, the highly reactive preflush opens preferential flow paths into the rock, due to dissolution of carbonate. As a result, damaged zones of the formation may be bypassed. The HF-containing acid when subsequently introduced may therefore follow these flow paths and thus may not contact the plugging clays and other siliceous minerals which it is designed to dissolve. While pre-flushes reduce the risk of the principal HF-containing acid stage from contacting carbonate minerals, they are not always successful.

Efforts have been undertaken to substitute or eliminate HCl in sandstone acidizing operations while minimizing or eliminating the precipitation of solid precipitates and colloidal amorphous gels.

Alternatives to HCl/HF mud acids for stimulating sandstone reservoirs have been reported which contain HF and an amino polycarboxylic acid such as glutamic acid-N,N-diacetic acid (GLDA) or hydroxyl ethylene diameinetriacetic acid (HDEDTA). However, such ligands have limited applications because of their propensity to precipitate metal fluorides. To minimize the negative effects associated with free fluoride in the formation of solid precipitates, the concentration of HF in such systems has been limited to less than 1%.

A need exists therefor for improved fluids for acid stimulation of siliceous formations.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

The disclosure relates to a method of increasing the permeability of a siliceous subterranean formation by use of a fluid containing a glutamic-N,N-diacetic acid or salt or a mixture thereof; a HF or HF-generating component and an organophosphonate.

In an embodiment, a fluid comprising a glutamic-N,N-diacetic acid, salt or a mixture thereof, HF or a HF-generating component and an organophosphonate is introduced into a well penetrating a siliceous subterranean formation. The organophosphonate may be of the formula:

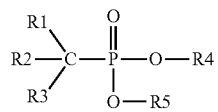

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical. Such organophosphonates include 1-hydroxyethylidine-1,1-diphosphonic acid, diethylene triamine penta(methylene phosphonic acid) and amino tri(methylene phosphonic acid) and mixtures thereof. During the reaction of glutamic-N,N-diacetic acid or salt or a mixture thereof and the HF or HF-generating component with the siliceous formation, un-complexed monovalent ions, divalent ions or a combination thereof are generated. A complex is formed by sequestering the un-complexed monovalent ions, divalent ions or combination thereof with the organophosphonate.

In another embodiment, a method of stimulating production in a siliceous subterranean formation penetrated by a well is provided wherein a treatment solution is first prepared containing a glutamic-N,N-diacetic acid, salt or a mixture thereof; HF or a HF-generating component and an effective amount of an organophosphonate compound capable of sequestering monovalent ions, divalent ions or a combination thereof. The treatment solution is introduced into the well and contacts the formation. Siliceous materials of the formation are dissolved and monovalent ions, divalent ions or a combination thereof are generated. The generated monovalent ions, divalent ions or a combination thereof complex with the organophosphonate compound. Precipitates from the generated monovalent ions, divalent ions or combination thereof are minimized or prevented by the formation of the complex. Hydrocarbons are then produced from the siliceous formation.

In another embodiment of the disclosure, a method of treating a siliceous formation to increase the formation's permeability is provided. In this embodiment, a treatment solution containing a glutamic-N,N-diacetic acid, salt or a mixture thereof, HF or a HF-generating component and an organophosphonate is prepared. The organophosphonate may be one or more compounds of the formula:

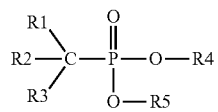

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical. Such organophosphonates include 1-hydroxyethylidine-1,1-diphosphonic acid, diethylene triamine penta(methylene phosphonic acid) and amino tri(methylene phosphonic acid) and mixtures thereof. The siliceous formation is then contacted with the treatment solution so that siliceous materials within the formation are dissolved. Complexes of the organophosphonate are formed with monovalent ions, divalent ions or a combination thereof generated during the process. The permeability of the formation is enhanced by minimizing or preventing reaction of the monovalent ions, divalent ions or a combination thereof with components in the well other than the organophosphonate.

In another embodiment, a method of stimulating a sandstone formation penetrated by an oil or gas or geothermal well is provided. In this embodiment, a buffered HF-acidizing solution is introduced into the well. The buffered HF-acidizing solution contains a glutamic-N,N-diacetic acid, salt or a mixture thereof, HF or a HF generating component or a mixture thereof and an organophosphonate of the formula:

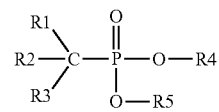

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical. The pH of the acidizing solution is between from about 1.9 to about 4.8. Complexes are formed between the organophosphonate and monovalent ions, divalent ions or a combination thereof after introduction of the treatment solution into the well. The formation is stimulated after the introduction of the buffered HF-acidizing solution into the well.

In another embodiment of the disclosure, a method of remediating a sandstone formation of an oil or gas or geothermal well is provided. In this embodiment, a buffered HF-acidizing solution is introduced into the well. The buffered HF-acidizing solution contains a glutamic-N,N-diacetic acid, salt or a mixture thereof; HF or a HF generating component or a mixture thereof; and an organophosphonate of the formula:

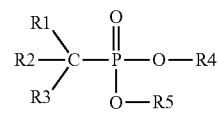

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical. The pH of the acidizing solution is between from about 1.9 to about 4.8. Complexes of the organophosphonate and the monovalent ions, divalent ions or combination are formed after introduction of the treatment solution into the well. The well is remediated by removing the formed complexes.

In another embodiment, a pre-flush may be introduced into the well prior to introduction of the treatment solution.

In another embodiment, an overflush may be introduced into the well after introduction of the treatment solution and after formation of the complexes of the monovalent ion, divalent ion or combination thereof.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

As used herein the term "siliceous" refers to the characteristic of having silica and/or silicate. Most sandstone formations are composed of over 50-70% sand quartz particles, i.e. silica ($SiO_2$) bonded together by various amounts of cementing material including carbonate (calcite or $CaCO_3$) and silicates.

Subterranean sandstone or siliceous formations are treated with an acidic fluid to stimulate the formation and to remove the damage from the formation. The damage, which impairs fluid flow of produced hydrocarbons, is typically created by an accumulation of silica fines or clays (aluminosilicates).

In the process, the acidic fluid enhances the production of hydrocarbons by opening pores and increasing the size of the pores within the formation. Permeability impairment of the formation is improved by attacking and dissolving siliceous minerals, such as clays and quartz fines, which are commonly associated with plugging of formation pore spaces. Permeability is thus enhanced by the enlargement of passageways for produced hydrocarbons. In the process, damage to the formation, especially in near wellbore regions, is further repaired.

The aqueous acidizing fluid contains (i) a glutamic-N,N-diacetic acid (GLDA) or salt thereof or a mixture of GLDA and GLDA salt; (ii) HF or a HF-generating component; and (iii) an organophosphonate. GLDA improves penetration of the acid into the formation. The combination of the GLDA or salt and HF or HF-generating component is highly effective in dissolving and removing siliceous material. The acidizing fluid has been illustrated to have the same dissolving capability with respect to siliceous minerals as mud acids.

In addition to unclogging the pore spaces of the formation, the damaging effects caused by de-consolidation of the matrix can be eliminated or dramatically reduced by the acid treatment.

The GLDA or salt with HF is used as an alternative to a HCl/HF mud acid. As such, the aqueous acidizing fluid is free of HCl.

The glutamic-N,N-diacetic acid or salt may be used as pure glutamic-N,N-diacetic acid or salt as well as glutamic-N,N-diacetic acid or salt diluted with water or other solvents. When diluted, the amount of glutamic-N,N-diacetic acid, salt or mixture thereof should be no less than 5 percent by weight. Preferably, the amount of glutamic-N,N-diacetic acid, salt or mixture thereof in the solution is between from about 5 to about 95 weight percent.

Preferred glutamic-N,N-diacetic acid salts are alkali salts, such as glutamic-N,N-diacetic acid sodium salt; particularly preferred is tetrasodium glutamate diacetate.

Typically, the amount of glutamic acid-N,N-diacetic acid, salt or mixture thereof in the acidic fluid ranges from about 5 to about 50 weight percent; preferably less than about 40, most preferably less than about 20, weight percent. This is a much higher amount than acidizing fluids of the prior art which used polycarboxylic acids to bind metals. For instance, the amount of polycarboxylic acid required in a 15 wt. % acid in the acidizing fluid to bind 1000 ppm of $Fe^{+3}$ in the fluid was 0.14 wt. %.

To attain maximum increase in permeability, the ratio of GLDA (or salt) to HF concentration in the fluid is generally from 5:1 wt. to 10:0.1, typically from 20:1 and most typically around 10:1.

During the period of dissolving siliceous material, the GLDA and HF react with clay and carbonate minerals in the formation. Monovalent and/or divalent ions are generated during the process. The organophosphonate serves as a sequestering agent and complexes the monovalent ions and/or divalent ions. In the absence of the organophosphonate, the uncomplexed monovalent and/or divalent ions would create precipitants such as sodium and potassium hexafluorosilicates, calcium fluoride and hydrated silica. The presence of the organophosphonate in the fluid minimizes or eliminates the creation of such precipitates. Permeability of the formation is increased by minimizing or preventing reaction of the monovalent ions, divalent ions or a combination thereof with components in the well other than the organophosphonate.

By forming complexes with the monovalent and/or divalent ions, precipitates are not deposited in the porous media. Core flood testing of the aqueous fluid showed less than 15% of uncomplexed monovalent and/or divalent ions in effluent. Permeability of the formation is therefore enhanced. This further improves the effectiveness of the interaction of GLDA and HF in the acidizing process.

The amount of HF or HF-generating component in the acidizing solution is generally between from about 0.25 to about 20 weight percent, preferably between from about 0.5 to about 10 weight percent, more preferably from about 1.0 to about 6 weight percent (based on the total weight of the aqueous fluid).

The organophosphonate is preferably an acid or salt (as well as esters) of the formula:

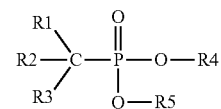

wherein R1, R2 and R3 may be hydrogen, alkyl, aryl, phosphonates, phosphates, acyl amine, hydroxy and carboxyl groups and R4 and R5 may consist of hydrogen, sodium, potassium, ammonium or an organic radical.

The concentration of the organophosphonate in the acidizing solution is generally between from about 0.25 to about 50.0, preferably from about 0.5 to about 6.0, more preferably about 1 to 5, percent by weight of the total solution.

Examples of organophosphonates include aminotri (methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt.

Though not required, the acidizing fluid may further contain an organic acid or boric acid. When present, the source of HF may be a HF-generating component such as ammonium bifluoride or ammonium fluoride or a combination thereof. Use of a HF-generating component offers a means of reducing the reaction rate of HF within the area surrounding the wellbore as slow hydrolysis of ammonium bifluoride or ammonium fluoride is converted to HF. While the use of the HF-generating component allows the acid to penetrate slightly further into the formation (compared to the fluid containing HF), it does not eliminate precipitates from forming and clogging the matrix.

The pH of the aqueous acidic fluid is typically in the range from about 1.5 to about 4.8. Generally, the pH of the acidic fluid is generally much higher than conventional mud acids, being generally in the range of pH 2.2 to about 3.8.

In an embodiment, the acidic fluid may contain a buffering agent or may be buffered by use of a gaseous foaming agent. Buffering to an elevated pH has advantages in terms of corrosion and general reactivity, allowing deeper matrix penetration of live acid and reduced requirements for corrosion inhibitors. Other advantages of higher pH fluids include reduced risk to surface equipment including pipelines, reduced risk to the environment and personnel, reduced chemical requirement for neutralization, reduced risk of creating sludges and emulsions and reduced risk of upset to process facilities.

Prior and/or subsequent to introduction of the acidizing fluid into the well, a pH buffered acid solution may be introduced into the well. The buffered acid solution typically has a pH substantially equivalent to that of the acidizing solution. When used in sandstone formations, the buffered acid solution may be employed prior to introduction of the acidizing solution or after the introduction of the acidizing solution into the well. The buffered acid solution, typically, has a pH of at least 3.2 and generally has a pH from about 3.2 to about 4.8. The pH of the buffered acid solution is substantially equivalent to that of the pH of the sandstone acidizing solution. The pH buffered acid solution is void of HF and preferably does not contain any other inorganic acid such as HCl. The buffered acid solution may contain an organic acid. In a preferred embodiment, the buffered acid solution and the application thereof is that disclosed in U.S. Pat. No. 7,059,414, herein incorporated by reference.

The aqueous fluid disclosed herein has been found to be useful in high temperature wells without issues of corrosion management. In some cases, the temperature of the well can be more than 360° F., 400° F., 450° F. or 500° F.

While the disclosed aqueous acidizing fluid offers a low corrosive stimulation/remediation treatment, it may optionally contain a corrosion inhibitor. The aqueous fluid thus reduces the corrosive effects that the acids may have on well tubulars. Suitable corrosion inhibitors may include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms) and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol. Further, the corrosion inhibitor may comprise an anionic surfactant such as alkyl sarcosinates and other agents disclosed in U.S. Pat. No. 7,994,102, herein incorporated by reference.

The acidizing fluid may further contain a corrosion inhibitor intensifier. Suitable corrosion inhibitor intensifiers include sodium formate, potassium formate, methylformate, ethylformate, sodium iodide, potassium iodide, copper iodide, molecular iodide as well as combinations thereof.

When present, the amount of corrosion inhibitor and/or corrosion inhibitor intensifier in the aqueous fluid may range from about 0.1 vol. % to about 15 vol. %; alternatively, from about 0.1 vol. % to about 10 vol. %; or alternatively, from about 0.5 vol. % to about 6 vol. %.

In a preferred embodiment, the acidizing fluid contains a non-emulsifier to prevent formation of emulsions in the acidizing fluid. Conventional non-emulsifiers may be used.

Use of the aqueous acidic fluid disclosed herein does not require either a preflush or overflush. By not requiring use of a pre-flush solution, the method disclosed herein is more environmentally friendly than other methods offered in the prior art. In addition, by not requiring a preflush or overflush provides minimal risk of undesired reactions with the reservoir rock.

While not necessary, however, a pre-flush or overflush solution, such as ammonium chloride based overflush solutions, may be used.

In addition to opening pore channels in the formation, the acidizing solution may be employed in the remediation of oil, gas and geothermal wells in the removal of unwanted deposits from the wellbore and production equipment.

In addition to its use in matrix acidizing, the invention is applicable in remediation of oil, gas and geothermal wells by the removal of deposits from the wellbore and production equipment. Such deposits form and/or accumulate in the wellbore, production and recovery equipment and well casing. Such accumulated deposits affect productivity and are typically removed prior to cementing or the introduction of completion fluids into the wellbore. The aqueous acidic fluid is introduced into the well to remove the undesired deposits prior to the introduction of a stimulation fluid. In a preferred embodiment, the invention is used to remove siliceous deposits inside well tubulars.

In well remediation, the acidizing solution is preferably injected directly into the wellbore through the production tubing or through the use of coiled tubing or similar delivery mechanisms. Once downhole, the solution remedies damage caused during well treating such as, for instance, by stimulation fluids and drilling fluid muds, by dispersing and removing siliceous materials from the formation and wellbore.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of increasing the permeability of a siliceous subterranean formation comprising:
   (a) introducing into a well penetrating a siliceous subterranean formation an acidic fluid containing (i) from about 5 to about 50 weight percent of a glutamic-N,N-diacetic acid, salt or mixture thereof; (ii) from about 0.25 to 20 weight percent of a HF or a HF-generating component; and (iii) between from about 0.25 to about 50 weight percent of an organophosphonate compound, wherein the ratio of glutamic-N,N-diacetic acid or salt to HF concentration in the fluid is from 5:1 to 10:0.1 and wherein either the fluid contains ammonium bifluoride or ammonium fluoride or a combination thereof as the HF-generating component or the organophosphonate of the fluid is of the formula:

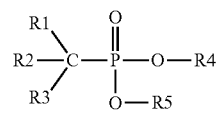

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical;
   (b) dissolving siliceous materials of the formation and generating monovalent ions, divalent ions or a combination thereof; and
   (c) forming a complex of the organophosphonate and monovalent ions, divalent ions or a combination thereof after introduction of the acidic fluid into the well.

2. The method of claim 1, wherein the organophosphonate is of the formula:

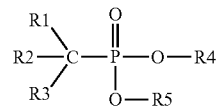

3. The method of claim 1, wherein the acidic fluid contains ammonium bifluoride or ammonium fluoride or a combination thereof as a HF-generating compound and further wherein the organophosphonate is selected from the group consisting of 1-hydroxyethylidine-1,1-diphosphonic acid, diethylene triamine penta(methylene phosphonic acid) and aminotri (methylene phosphonic acid) and mixtures thereof.

4. The method of claim 1, wherein (i) the pH of the fluid is between from about 1.9 to about 4.8; (ii) the fluid further comprises an organic acid; or (iii) the pH of the fluid is between from about 1.9 to about 4.8 and the fluid further comprises an organic acid.

5. The method of claim 1, wherein the amount of:
   (i) glutamic acid-N,N-diacetic acid, salt or mixture thereof in the acidic fluid is from about 5 to about 20 weight percent;
   (ii) HF or HF-generating component in the acidic fluid is from about 0.5 to 10 weight percent; and
   (iii) organophosphonate in the acidic fluid is between from about 0.5 to about 6.0 weight percent.

6. The method of claim 1, wherein a pre-flush is introduced into the well prior to introduction of the acidic fluid.

7. The method of claim 6, wherein an over-flush is introduced into the well after step (c).

8. The method of claim 1, wherein an over-flush is introduced into the well after step (c).

9. The method of claim 1, wherein the acidic fluid comprises a HF-generating component, wherein the HF-generating compound is ammonium bifluoride or ammonium fluoride or a combination thereof.

10. The method of claim 1, wherein the acidic fluid further comprises a corrosion and/or non-emulsifier, wherein the corrosion inhibitor optionally further comprises a corrosion inhibitor intensifier.

11. The method of claim 1, wherein the acidic fluid is free of HCl.

12. The method of claim 1, wherein the glutamic-N,N-diacetic acid, salt or mixture thereof is a glutamic-N,N-diacetic acid sodium salt.

13. The method of claim 12, wherein the glutamic-N,N-diacetic acid salt is tetrasodium glutamate diacetate.

14. The method of claim 1, wherein the ratio of glutamic-N,N-diacetic acid or salt to HF concentration in the fluid is from 20:1 to 10:0.1.

15. A method of stimulating production in a siliceous subterranean formation of an oil, gas or geothermal well comprising:
   (a) introducing into a well penetrating a siliceous subterranean formation an acidic fluid comprising (i) from about 5 to about 50 weight percent of a glutamic-N,N-diacetic acid or salt or a mixture thereof; (ii) from about 0.25 to 20 weight percent of ammonium bifluoride or ammonium fluoride or a combination thereof as a HF-generating compound; and (iii) between from about 0.25 to about 50 weight percent of an organophosphonate selected from the group consisting of 1-hydroxyethylidine-1,1-diphosphonic acid, diethylene triamine penta(methylene phosphonic acid) and aminotri (methylene phosphonic acid) and mixtures thereof, wherein the ratio of glutamic-N,N-diacetic acid or salt to HF concentration in the fluid is from 5:1 to 10:0.1;
   (b) reacting the glutamic-N,N-diacetic acid, salt or mixture thereof and the HF or HF-generating component with the siliceous subterranean formation and generating un-complexed monovalent ions, divalent ions or a combination thereof; and
   (c) forming a complex by sequestering the un-complexed monovalent ions, divalent ions or combination thereof with the organophosphonate; and
   (d) producing hydrocarbons from the siliceous formation.

16. The method of claim 15, wherein (i) the pH of the acidic fluid is between from about 1.9 to about 4.8; (ii) the acidic fluid further comprises an organic acid; or (iii) the pH of the acidic fluid is between from about 1.9 to about 4.8 and the acidic fluid further comprises an organic acid.

17. The method of claim 15, wherein at least one of the following conditions prevail:
   (i) a pre-flush is introduced into the well prior to introduction of the acidic fluid;
   (ii) an over-flush is introduced into the well after introduction of the acidic fluid and after formation of the complexes of the monovalent ion, divalent ion or combination thereof; or
   (iii) the glutamic-N,N-diacetic acid, salt or mixture thereof is a glutamic-N,N-diacetic acid sodium salt.

18. The method of claim 15, wherein the acidic fluid is free of HCl.

19. A method of remediating a sandstone formation of an oil or gas or geothermal well by:
(a) introducing into the well a buffered HF-acidizing fluid comprising:
  (i) from about 5 to about 50 weight percent of a glutamic-N,N-diacetic acid, salt or mixture thereof;
  (ii) from about 0.25 to 20 weight percent of HF or a HF generating component or a mixture thereof;
  (iii) from about 0.25 to about weight percent of an organophosphonate of the formula:

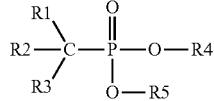

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical and wherein the ratio of glutamic-N,N-diacetic acid or salt to HF concentration in the fluid is from 5:1 to 10:0.1 and the pH of the acidizing fluid is between from about 1.9 to about 4.8; and
(b) forming complexes of the organophosphonate with monovalent ions, divalent ions or a combination thereof after introduction of the acidizing fluid into the well; and
(c) remediating the well by removing the formed complexes therefrom.

20. The method of claim 19, wherein at least one of the following conditions prevail:
  (i) the acidizing fluid further comprises an organic acid;
  (ii) a pre-flush is introduced into the well prior to introduction of the acidizing fluid;
  (iii) an over-flush is introduced into the well after introduction of the acidizing fluid and after formation of the complexes of the monovalent ion, divalent ion or combination thereof;
  (iv) the acidic fluid comprises the HF-generating component, wherein the HF-generating component is ammonium bifluoride or ammonium fluoride or a combination thereof; or
  (v) the glutamic-N,N-diacetic acid, salt or mixture thereof is a glutamic-N,N-diacetic acid sodium salt.

* * * * *